A. B. BREEZE.
OILING DEVICE FOR REACH RODS.
APPLICATION FILED SEPT. 5, 1919.
1,415,000. Patented May 2, 1922.
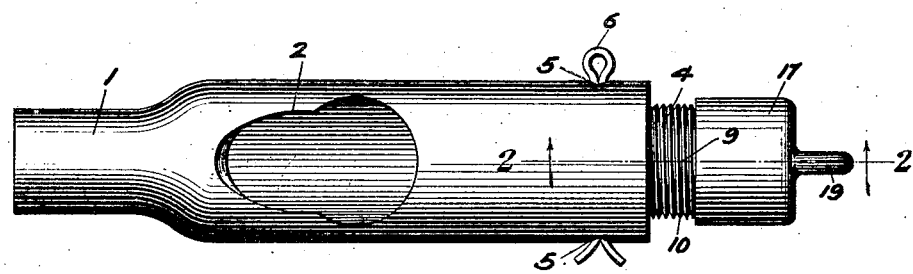
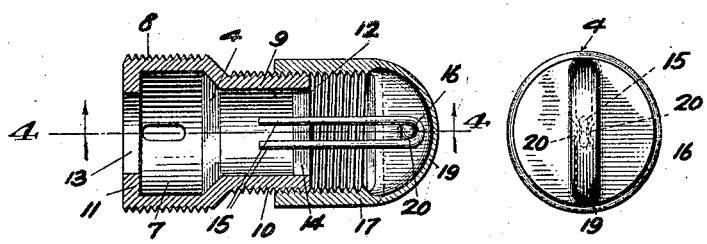 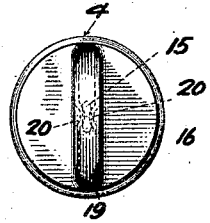
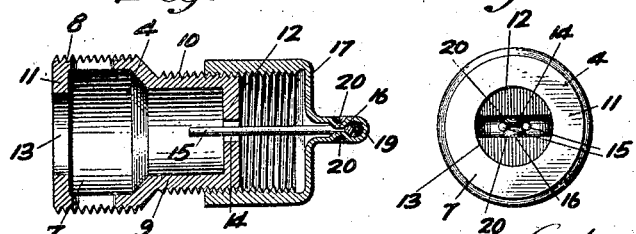 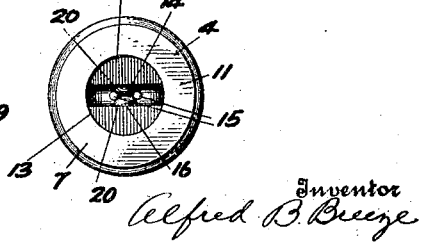
Inventor
Alfred B. Breeze
By Wood & Wood
Attorneys

UNITED STATES PATENT OFFICE.

ALFRED B. BREEZE, OF CINCINNATI, OHIO, ASSIGNOR TO THE CINCINNATI BALL CRANK COMPANY, OF CINCINNATI, OHIO, A CORPORATION OF OHIO.

OILING DEVICE FOR REACH RODS.

1,415,000.	Specification of Letters Patent.	Patented May 2, 1922.

Application filed September 5, 1919. Serial No. 321,946.

*To all whom it may concern:*

Be it known that I, ALFRED B. BREEZE, a citizen of the United States, and residing at Cincinnati, in the county of Hamilton and State of Ohio, have invented a new and useful Improvement in Oiling Devices for Reach Rods, of which the following specification is a full disclosure.

This invention relates to improvements in caps or closures for grease cups, particularly as applied to reach rods, drag links, and the like, and is designed particularly to be used on motor vehicles, but may find application to various additional structures. It has among its objects to provide a closure that when placed in position will be locked against accidental displacement due to vibrations and jars incidental to the operation of the mechanism to which it is applied. The closure is simple in construction, efficient in operation and economical of manufacture.

With these and other objects in view, my invention consists of a novel combination of parts, a preferred form of the embodiment of which is shown in the accompanying drawings forming part of this specification.

In the drawings, Figure 1 is a plan view of my device, shown applied to one end of a steering reach rod.

Figure 2 is a sectional view on the line 2—2 of Figure 1, the reach rod being omitted.

Figure 3 is an end view of the closure.

Figure 4 is a section on the line 4—4 of Figure 2.

Figure 5 is an end view of the tubular plug, with the closure applied thereto.

Referring to the drawings, 1 represents the steering reach rod which may be of any desired form of construction, provided with the usual opening 2 for the reception of the ball-arm, and also provided at its end with screw threads, not shown, designed to co-act with threads of a tubular plug 4. The reach rod 1 is further provided with diametrically opposed openings 5, for the reception of a split key or cotter pin 6 for a purpose hereinafter described.

The tubular plug 4 as a metal stamping, has a body portion 7 exteriorly threaded at 8, an extension 9 exteriorly threaded at 10, and end walls 11 and 12. The end wall 11 as an inturned flange, provides an opening 13 to allow the lubricant to be forced through the plug to the ball-arm and its connections, mounted within the hub end of the steering rod. The wall 12 is provided with an elongated rectangular slot 14, receiving therethrough and co-acting with a spring locking member 15 rigidly attached at 16 to the closure or cap 17. This locking member constitutes a U-shaped clip made of a resilient wire, having a loop end for anchoring the clip rigidly within the cap, and two parallel limbs or prongs compressible toward each other as they engage the side walls of the rectangular slot 14 when the plug is rotated, and when engaged with the side walls of the slot offer resistance against any free rotation of the cap to prevent accidental unthreading of the cap upon the plug.

The cap 17 comprises a sheet metal stamping, having a tubular body portion with a closed rear end compressed to provide a flat thumb hold or extension 19 of arcuate form, clamping the end of the clip 15 between the layers of the material of the thumb hold, which layers are oppositely countersunk to provide opposing teats 20 engaged into the loop of the clip, securely fastening the clip against lateral displacement between the walls or layers of the thumb hold. The clip may be variously shaped and formed, although the form shown is very simple and effective.

In the operation, the U-shaped locking pin is inserted into the rectangular slot 14 until the threads of the cap 17 coact with the threads 10 of the extension 9. As the cap is rotated and advances upon the plug, the arms or prongs of the U-shaped spring locking member or clip impinge upon the sides of the slot 14 causing the said arms to be compressed, offering a resistance against any free rotation of the cap, until they again clear the side walls of the slot, when they snap into their initial position, this alternate compression and expansion taking place until the cap has been advanced to the desired position.

It will be seen by an inspection of Figure 5 that the arms of the U-shaped spring locking pin are spaced apart a substantially greater distance than the width of the slot 14, so that of necessity they will be brought under compression by rotation of the cap 17. It will also be noted that the width of the slot 14 is slightly greater than twice the diameter of the wire of which the U-shaped spring locking pin is made, thus allowing the said arms to be completely rotated.

It will be noted, however, that considerable force is necessary to rotate the cap 17, due to the frictional engagement between the arms of the U-shaped spring locking pin, and the sides of the slot 14.

It will also be seen that under the above conditions no ordinary jar or vibration can loosen the cap 17.

The plug provides an abutment for the parts of a ball and socket joint mounted within the hub end of the rod 1 and the cap 17, a grease or lubricant cup which as it is threaded upon the end of the plug forces the lubricant through the tubular plug to the parts of the ball and socket joint.

Having described my invention, what I claim, and desire to secure by Letters Patent is:

1. In a device of the class described, a tubular reducer plug having its reduced end provided with a rectangularly apertured closure wall, a cap screw threaded upon said reduced end of the plug, having a compressed head, and a U-shaped clip having its boss end centrally compressed with the cap head and its limbs engaged through the apertures of said plug and closure wall.

2. In a device of the class described, a tubular reducer plug having its reduced end provided with a rectangularly apertured closure wall, a cap screw threaded upon said reduced end of the plug, and a U-shaped clip secured within said cap, having its parallel limbs projected to engage through said aperture of the plug and closure wall.

In witness whereof, I hereunto subscribe my name, as attested by the two subscribing witnesses.

ALFRED B. BREEZE.

Witnesses:
L. BECK,
M. BARRON.